Jan. 7, 1930. F. W. THURSTON Re. 17,557
MINING DRILL
Original Filed April 23, 1925
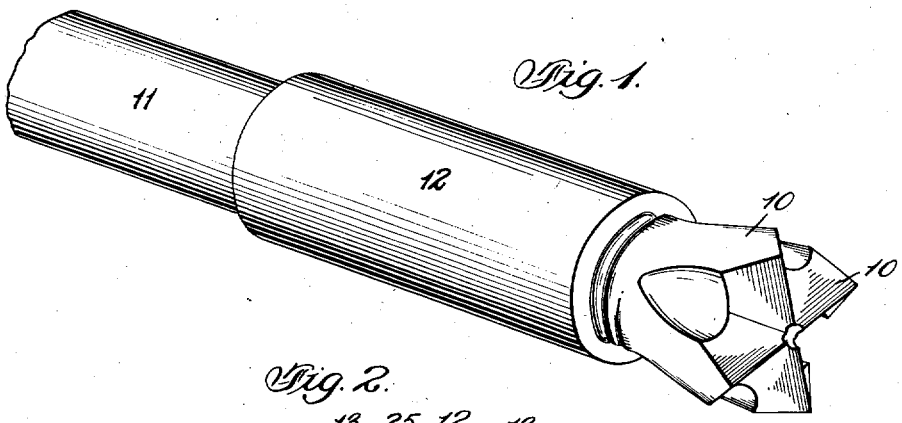
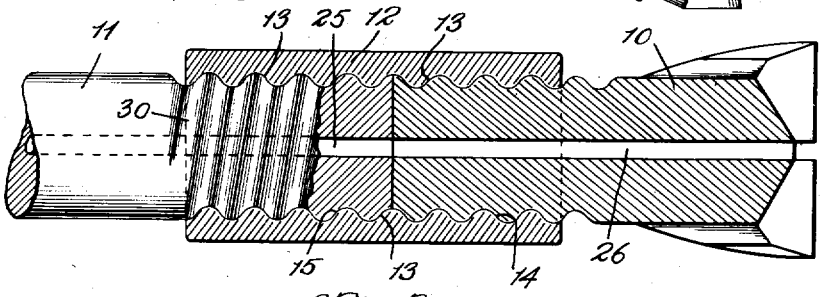
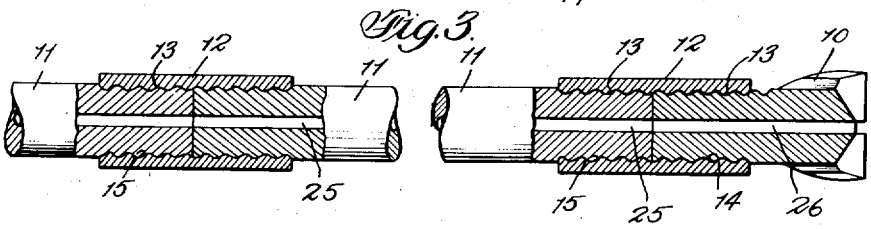
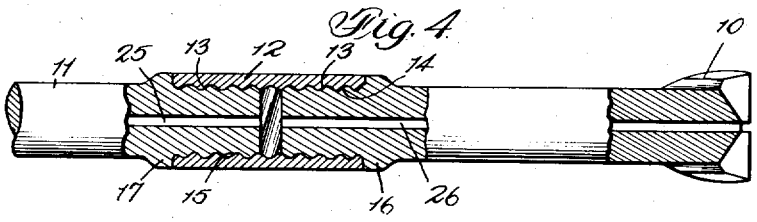
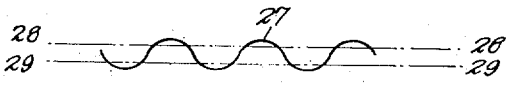
Fig. 5.
Inventor
Fred W. Thurston
By H. N. Low
Attorney Reissued Jan. 7, 1930

Re. 17,557

UNITED STATES PATENT OFFICE

FRED W. THURSTON, OF LOS ANGELES, CALIFORNIA

MINING DRILL

Original No. 1,642,183, dated September 13, 1927, Serial No. 25,401, filed April 23, 1925. Application for reissue filed September 7, 1929. Serial No. 391,087.

This invention relates to drills which are adapted for drilling rock and the like; and more particularly to drills designed to be percussively driven and rotated, and adapted for deep drilling operations; but my improvements may be employed in other types of drills including those used for oil drilling and earth boring.

This invention has for its general object an improved construction and arrangement of parts which is particularly durable and efficient, and is readily adapted to manufacturing and drilling operations.

Another object is to provide a construction for drills composed of separable parts which are rigidly articulated, possess ruggedness and wear-resisting qualities, and are designed to be readily assembled and disassembled; special provision being made against the binding or locking together of the parts.

Still another object is to provide a drill having a detachable bit or head with a screw threaded coupling part preferably having shock-absorbing constitution, characteristics and capacity, which is adapted rigidly to support the detachable bit.

A further object of the improvements is to provide a drill which is, in most cases of fracture, capable of easy and economical repair.

A more specific object of this invention is to provide a drill composed of separable screw-threaded sections with a form of thread which has characteristics specifically adapting it to withstand the effects of the impacts from a high duty drilling machine during a drilling operation, and also by means of which form of screw threads the parts may be readily disassembled after the drilling operation.

Every drill may ultimately encounter conditions causing breakage, and another object of this invention is to provide a sectional drill construction whereby the breakage from percussive driving is mostly confined to limited zones (in the coupling or near the extremities of the rod or bit), so as to obtain substantially maximum drilling efficiency with substantially minimum breakage of the parts, and so that a breakage when it occurs will ordinarily be in a zone where the damage to the drill as a whole, the loss of steel and the cost of repair will be minimized.

As to the desirable properties and characteristics of the main elements of the drill, such as the bit, drill rod and intermediate or coupling member, they are or may be such as are set forth in my reissued Patent No. 16,061, granted May 5, 1925.

Other objects of this invention will in part be hereinafter specifically pointed out and in part obvious from the arrangements and constructions here set forth.

The invention accordingly consists in the features of construction, combinations of elements and arrangement of parts which will be exemplified in the construction hereinafter set forth, and the scope of this application will appear in the appended claims.

For a more complete understanding of the nature and advantages of this invention reference should be had to the following detailed description, which describes the best illustrative embodiments of this invention at present known to me, taken in connection with the accompanying drawing in which:

Fig. 1 shows, in perspective, an assembled mining drill embodying this invention, and comprising a bit and drill rod, and an intermediate or coupling member from which they are detachable.

Fig. 2 is a longitudinal section of the same, the drill rod being partly broken away.

Fig. 3 is a similar view, illustrating the use of a plurality of couplings and of drill rod sections, all coupled in line with each other for deep sectional drilling.

Fig. 4 is a similar view showing the manner of more or less relieving the screw threads from excessive stress and shock, by providing the drill rod and bit with shoulders, which abut against the ends of the coupling, and showing also a longer bit-section.

Fig. 5 is a diagram illustrating the form of the undulatory screw thread.

Heretofore there have been unavoidable waste and loss in the use of mining drill steel, due to the short life and fracture, in one place or another, of the drill as a whole, and also of its principal elements where it has been made in separable sections.

The average mining drill machine (percussive type) used in connection with a standard inch and a quarter drill steel, delivers a 15-pound hammer blow at the rate of 2300 blows a minute, and the revolving of the drill steel caused by the machine when applied against the reverse resistance of the bit in the hole causes great locking pressure to take place in a drill of this invention. The screw threads necessary to practical sectional drill construction must stand up under the powerful impacts or vibrations set up by the hammer, and the substantially equal reactions therefrom, and said threads must also not become immovably interlocked but must disengage freely, so that they can be readily unscrewed and the parts of the drill easily separated after the drilling operation for readjustment, or for resharpening and repair. Also, the screw threads must be so shaped as not to cause or aid the fracturing of any of the drill-sections, and I encountered great difficulties with former shapes of threads until I arrived at the present invention.

Prolonged and intensive study of the great variety of conditions involved in the problem of producing a more practically economical mining drill, accompanied by numerous practical experiments, led to the improvement set forth in my patent herein referred to, but the related subject of the best and most practical construction of the screw threads (which I have also discovered by said study and experiment) is not considered in said patent but is the subject of my present invention. According to this improvement the screw threads are substantially smooth, continuously curved and rounded at all parts and especially at the concave or gutter parts of the thread. The convex or top portions of the screw threads should also, for the best results, be smoothly rounded and my invention does not exclude a semi-cylindrical formation of the extreme convex portions or highest parts of the screw threads. The thread is thus of what may be called a sinuous or undulatory contour continuously curved, in cross section, both the deepest and highest parts of the thread being of a substantially semi-circular contour; but it is best to make said several parts of the contour of a little less than a half circle so that a tangent line joining the outline of the lowest part of the thread with the outline of the highest part of the thread will be a little inclined (longitudinally) relative to the axis of the drill as a whole, thus retaining more metal and consequent strength, both in the couplings and threaded ends.

These threads may be formed on the steel by dies for cutting the same, or by forging or swaging them. The threads in the coupling are usually formed by tapping. Experiments have been conducted in casting a screw threaded coupling part suitable in strength and otherwise for such a coupling member, and my invention does not exclude a coupling member so produced. It will further be understood that the threads could be deeper than above described and as shown in my drawings, and could have substantially the contour of a half circle for the convex part of the screw thread and of a half circle for the deepest part of the screw thread, in which case the drill would function successfully, but in such deeper screw thread construction metal would be removed which could better be left in the rod to add to the general strength of the same.

Referring now to the drawing, 10 denotes the bit or drill head which is separable from but rigidly supported by the drill-rod 11. The drill-rod is not directly connected with the bit 10, but has an intermediate or coupling part of member 12, which is separable from the drill-rod proper.

In order that the bit 10 may be rigidly supported by the drill-rod, the intermediate or coupling member 12 is designed for threaded engagement with both the bit 10 and the drill-rod 11. This is conveniently accomplished by an interior thread, as shown at 13, which is cut continuously in the same direction through the member 12, and engages with pilots or shanks having screw-threads 14 and 15, respectively provided on the bit 10 and the drill-rod 11. The direction of the screw-threads is such that, when the drill is being rotated during the drilling operation, the drill rod, bit and intermediate part tend to screw together more tightly. Usually the construction and operation of the percussive mechanism is such that a left hand thread is required for this purpose, but some machines require a right hand thread. In order that the coupling 12 and the shanks on which the threads 14 and 15 are made shall be particularly resistant to fracture, the said screw threads 13, 14 and 15 are made of undulating or sinuous contour illustrated on a larger scale in the diagrammatic Fig. 5.

Preferably the screw threads 14 and 15 are made of the full diameter of the ends of the bit and drill rod, thus removing as little metal as possible and obtaining the full strength of the steel composing said parts, and greatly simplifying the re-threading of them in case of fracture at or across the screw threads.

In the diagram, Fig. 5, is shown approximately the preferred manner of forming the undulatory screw threads on the three (or more) sections of the drill. The line 27 shows the contour of the screw thread looking at the side thereof and 28 is the line in which are located the centers for the curves for one half of the thread, the centers for the curves of the other half of the thread being in the line 29. The amount of metal saved for strengthening the sections, by thus somewhat flattening the curves of the screw threads, and each thread as a whole, is substantially indicated by the space between the lines 28 and 29.

The said screw threads are or may be relieved of more or less of the end thrust applied to the drill, usually by the percussive machine, by the abutment of the ends of the drill rod and bit against each other within the coupling, as shown in Figs. 2 and 3, or by shoulders 16 and 17, formed on the bit and rod respectively which shoulders abut against the ends of the coupling (Fig. 4) with or without contact of the rod and bit shanks with each other.

The turning of the drill by the machine, occurring after each percussion, causes the said threaded ends to screw inward towards each other, or tend to do so. This effects considerable pressure of said ends against each other (Figs. 2 and 3) or against the coupling by means of the shoulders 16, 17 (Fig. 4). It results from this that the outer faces of the threads 14 and 15 are strongly pressed against the inner faces of the thread 13 of the coupling. This pressure is somewhat relieved by the percussion, but is very greatly augmented by the reaction from such percussion, and has a strong tendency by repeated shocks (recurring about 2300 times in a minute) to disrupt the coupling. It is therefore of great importance that this coupling be formed and tempered to have shock-absorbing properties, as herein set forth, and that the threads be formed as embodied in this invention in order that they may withstand in service under the foregoing mentioned conditions.

The length of the threads on the ends or stems of the bits and in the couplings, as shown in Fig. 4, when the ends of the steel abut in the coupling, are preferably made of sufficient length so that when the coupling part is screwed clear up to the end of the thread on the rods, the end of the rod will extend for a distance of about half way through the coupling. Therefore, where the outer ends of the threads taper out on to the drill rod it forms a wedging stop at 30, with a tightening tendency when the coupling is screwed forcibly on to the rod as far as it will go. Provision is made to have the opposite threaded bit end which engages the coupling long enough so that when it has been screwed clear into the coupling to the point of abutment, it will not engage the tapered end of the thread 14, which might cause too much tightening tendency. One end or the other is desired to be relatively free for unscrewing. Ordinarily it is preferable to have the coupling remain tight on the drill rod so as not to be turned when the bit is removed, which is done more frequently than the removal of the coupling from the drill rod. This is shown in the assembled drawing Fig. 1, the extra threads being shown extending beyond the end of the coupling at the bit end thereof.

On the other hand where the shoulders are used, the coupling is screwed clear up to the shoulders and is stopped by abutting thereon.

Theoretically, it is desirable that the threaded ends meet at a point about the middle of the coupling member. However, this invention is not limited to this and may vary therefrom somewhat, and considering the fact that when the short types of bits are used and the same are discarded after becoming dull, it is desirable to have their stems as short as practicable, in which case the screw threaded end of the bit may enter the coupling for a less distance than half way therein and the screw threaded end of the rods may be extended to meet it in abutting engagement.

At 25 is shown a longitudinal passage through the drill rod, and sections thereof, and 26 is a similar passage through the bit, so that in the assembled drill there is provided a continuous passage through which a fluid such as water or compressed air may be forced during the drilling operation, to cool the bit and assist in the removal of particles of rock and the like resulting from the drilling. The bit may have any desired and suitable form, a cruciform bit being illustrated.

The drill may be greatly lengthened for deep drilling, as shown in Fig. 3, by the use of the required number of drill rod sections coupled to form a single long drill by a corresponding number of members 12. The long type of bit (Fig. 4) is adapted to be repeatedly resharpened by means of forging in the modern type of drill sharpening machine. The short type (Figs. 1, 2 and 3) is meant to be used in service until dull, then reground only, and used as many times as possible, at the end of which time it is discarded for a new one. The short bit is commonly referred to as the "throw-away" type of bit which is subject to no re-forging, or heat-treating process, and the long bit is commonly referred to as the "re-forging" type of bit. The longer type of bit may now be preferred in mining where there are present facilities for re-forging, heat treating, etc., while the short type of bit will ultimately do away with the expensive necessity of forging and heat treating bits at the mine, thus effecting greater economies.

The undulating or sinuous form of screw thread, as shown herein or of equivalent form, results in advantages of material value. In brief, the described form of screw threads, on the stems of the drill rod and bit and within the coupling member, enables said parts to live and function under stresses and shocks which would otherwise strain and fracture one or the other of the said parts, and consequently adds to the practical life of the drill; and enables the drill parts or sections to be readily separated; and enables the stems of the rod and bit to be re-threaded (when fractured) at decreased cost of time and labor; and materially aids in the much desired result of reducing the cost of mining. Accordingly the said screw threads are curved sufficiently to accomplish the above results.

In order to give an anti-fatigue property and characteristic to the drill rod, and a wear resisting property and characteristic to the bit, and a shock absorbing property and characteristic to the intermediate or coupling member, the following procedure is suitable, and preferable according to my present best information:

Regarding the method of heat treating the drill rod as herein shown, in order to gain the aforementtioned results, it has been found, where the same is constructed of a suitable analysis, that the required process of its manufacture, the heating temperatures necessarily used in connection therewith, and the working, molding, rolling, etc., to which the steel is subjected in forming the rod, especially in the hollow manner, as shown in the drawings, imparts to it desirable qualities for performing its particular function in the drill construction as a whole. However, additional heat treating may be applied to the rod after same is put through the manufacturing process, with increased desirable results, in substantially the following manner:—

*First.*—When the drill rod is made of a vanadium steel, and after the manufacturing and forming process is completed, same may then be placed in a suitable furnace, having a heating temperature of 1550 degrees F., wherein it may be left for a period of about 30 minutes, same is then removed and immersed in a suitable, prepared quenching oil mixture, which is easily obtainable for quenching purposes. After the rod is cooled off in the oil quench, same is then placed in a suitable furnace, having a heating temperature of 1100 degrees F., for purposes of drawing and tempering, wherein it may be left for a period of 30 to 45 minutes. It may, if it is found more convenient instead, be immersed in a suitable melted salt solution, having a maintained temperature of 1100 degrees F., for the same drawing purpose. When removed from the drawing process, it is ready for service. Where other alloys are used in the steel analysis, the heating temperature may vary somewhat to suit.

*Second.*—When the drill rod is made from ordinary commercial stock which is designed for certain tool purposes, as mentioned above, the same general process of heat treating may be followed, as given in the preceding paragraph, marked "First", with very desirable results, except however, it has been found that the heating temperatures used may be as follows, instead of those mentioned above: The first heating temperature may be at a 1525 degrees F., and the drawing temperature at 550 degrees F.

As to the treatment of the bit:

The bit 10, as shown in the drawing, and formed of chrome vanadium steel is placed in a suitable furnace, preferably gas-fired, having a heating temperature of 1525° F., and is left therein at that temperature for a period of 30 to 45 minutes. The part is then removed from the furnace and placed immediately in a bath of suitably prepared quenching oil, which may be of a viscosity of 100 to 130 seconds at 100° F. When so quenched, the part is then preferably immersed in a drawing bath, which may be composed of a suitable melted salt solution, having a heating temperature of 1250° F., or a similarly heated furnace may be used for this purpose, in connection with a suitable packing material, the part being left therein, at that maintained temperature, for a period of 45 minutes. After that lapse of time, it is removed therefrom, and the cutting end of the bit is then reheated to a temperature of 1525° F., and again quenched preferably in oil, and after which it is drawn or tempered at a temperature of about 400° F. for a distance of substantially one inch back from the cutting edge thereof. Where other alloys may be used, the degrees of heat may be somewhat varied to suit.

As to the coupling part:

The coupling part 12 in substantially the shape shown in the drawing, or of equivalent shape, and preferably formed of chrome-molybdenum steel, is first placed in a furnace, preferably gas fired, having a heating temperature of 1550 degrees F., and is left therein at that temperature the same being maintained for a period of 45 minutes. The part is then removed from the furnace and placed immediately in a suitably preferred bath of quenching oil, preferably of a viscosity of 100 to 130 seconds at 100 degrees F. When so quenched the part may then be immersed in a drawing bath, preferably composed of suitable melted salt solution, having a maintained heating temperature of 700° F., wherein it is left, at this maintained temperature, for a period of 45 minutes. After such time has elapsed, it is removed therefrom and is ready for service. Instead of a drawing bath, a similarly heated furnace may be used, in connection with a suitable packing material, and when other alloys are used in forming the coupling part, the degrees of heating temperature may be varied somewhat to suit.

It is not intended to imply that the foregoing various means of heating treating, nor the various specific alloys designated and pointed out, for the various parts of the drill, may be the only means of arriving at the desired results, in imparting to the various parts the desired qualities or characteristics, nor is it intended that this invention be limited in that direction, as any suitable means which renders the desired results are acceptable, and intended to be entirely within the scope of my invention.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

The screw threads of undulatory contour may be applied in any of the forms of rotary impact mining drill set forth in my Letters Patent 1,477,855, granted Dec. 18, 1923, and in reissued Letters Patent thereof No. 16,061, granted May 5, 1925.

It is also to be understood that the language used in the following claims is intended to cover all of the generic and specific features of the invention herein described, and all statements of the scope of the invention which, as a matter of language, might be said to fall therebetween.

I have described the mode of operation of the undulatory continuously curved screw thread, in preventing or lessening fractures in the sections, to the best of my present knowledge. Experiments in actual use show its undoubted usefulness for that purpose and in adding to the life of the drill, and probably it operates in ways not now understood to effect that result.

What I claim is:

1. An impact mining drill composed of separable sections comprising a drill rod, a bit, and a coupling member provided with an internal screw thread of undulatory curved contour, said rod and bit having ends formed with external screw threads of similar contour adapted to engage within the screw thread of the coupling member.

2. A rotary impact mining drill composed of separable sections comprising a drill rod, a bit, and a coupling member provided with an internal screw thread of undulatory and continuously curved contour, said rod and bit having ends abutting within the coupling member and formed with external screw threads of similar contour adapted to engage within the screw thread of the coupling member.

3. A rotary impact mining drill composed of separable sections comprising a drill rod, a bit, and a coupling member provided with an internal screw thread of undulatory and continuously curved contour, said rod and bit having ends formed with external screw threads of similar contour and of the full diameter of the rod and of the bit end, respectively, and adapted to engage within the screw thread of the coupling member.

4. A rotary impact mining drill composed of separable sections comprising a plurality of drill rod sections, a bit, and a plurality of coupling members provided with an internal screw thread of undulatory and continuously curved contour, said rod sections and bit having ends formed with external screw threads of similar contour adapted to engage within the screw thread of the coupling members.

5. A rotary impact mining drill composed of separable sections comprising a drill rod, a bit, and a coupling member having shock-absorbing properties and provided with an internal screw thread of undulatory and continuously curved contour, said rod and bit having ends formed with external screw threads of similar contour adapted to engage within the screw thread of the coupling member.

6. A rotary impact mining drill composed of separable sections comprising a drill rod having anti-fatigue properties, a bit having wear-resisting properties, and a coupling member having shock-absorbing properties and provided with an internal screw thread of undulatory and continuously curved contour, said rod and bit having ends formed with external screw threads of similar contour adapted to engage within the screw thread of the coupling member.

7. A rotary impact mining drill composed of separable sections comprising a drill rod, a bit, and a coupling member having shock-absorbing properties and provided with an internal screw thread of undulatory and continuously curved contour, said rod and bit having ends abutting within the coupling member and formed with external screw threads of similar contour adapted to engage within the screw thread of the coupling member.

8. A sectional mining drill having a coupling and its sections and coupling formed with and united by screw threads of smooth, continuously curved and undulatory form.

9. An elongated coupling sleeve for rotary impact mining drills of separable parts, formed on its interior with screw threads of smooth, continuously curved and undulatory contour, as described.

10. A sectional rotary impact mining drill of two or more sections having a plurality of its sections formed with and united by screw threads of curved undulatory contour.

11. In a rotary impact mining drill of the kind composed of separable sections, having a drill rod portion, a bit portion and a coupling portion, said portions being joined together by means of screw threaded connections and characterized by the fact that the screw threads provided are of undulating and continuously curved contour.

In testimony whereof I affix my signature.

FRED W. THURSTON.